April 11, 1961

L. DRAGONUK 2,979,212

MATERIAL HANDLING APPARATUS

Filed Oct. 29, 1959

INVENTOR.
LEO DRAGONUK

BY

AGENT

April 11, 1961  L. DRAGONUK  2,979,212
MATERIAL HANDLING APPARATUS
Filed Oct. 29, 1959  4 Sheets-Sheet 2

INVENTOR.
LEO DRAGONUK
BY
AGENT

INVENTOR.
LEO DRAGONUK

United States Patent Office 2,979,212
Patented Apr. 11, 1961

2,979,212

MATERIAL HANDLING APPARATUS

Leo Dragonuk, Plymouth Meeting, Pa., assignor to the United States of America as represented by the Secretary of the Navy Filed Oct. 29, 1959, Ser. No. 849,693

18 Claims. (Cl. 214—1)

(Granted under Title 35, U.S. Code (1952), sec. 266)

The invention described herein may be manufactured and used by or for the Government of the United States of America for governmental purposes without the payment of any royalties thereon or therefor.

This invention relates to material handling apparatus and more particularly to an apparatus particularly useful for handling materials, such as bombs, torpedos, missiles, and the like from stock piles or other ground stations and to elevate such weapons into connecting position with bomb shackles in aircraft bomb bays or on wings.

Heretofore, one of the major problems involved in loading heavy missiles onto wing shackles of folding wing aircraft is the provision of a compact material handling apparatus especially suitable for the loading of the missiles on shipboard based aircraft. The apparatus must be suitably compact and mobile as well as easily operated with relatively unskilled personnel on aircraft carriers where space is at a premium and where the aircraft are spaced relatively close together. However, it is to be understood that although the instant invention provides a solution to the above problem, it is also understood that the invention is suitable for use in connection with other types of material handling jobs and can be easily adapted to earth handling capabilities and other material handling capabilities for loading and unloading in aisles of supply dumps, as well as in warehouses.

One of the principal objects of the invention, therefore, is to provide a new and novel material handling apparatus suitable for carrying out the mission referred to hereinabove.

Another object of the invention is the provision of an improved material handling apparatus for picking up a bomb or missile, or the like for transport to a bomber or missile-carrying aircraft and then the elevation thereof into position with the shackle devices of the aircraft.

Another object of the invention is to provide an apparatus as set forth in the preceding object which has a cradle capable of angularly positioning the missile about its longitudinal axis for aligning and otherwise properly positioning the same with the shackles of the aircraft.

A still further object of the invention is the provision of an apparatus of the character described which has a cradle and articulated arm means suitable for supporting and positioning the loads.

Another object of the invention is the provision of a mechanism of the character described hereinabove having improved means for universally positioning the bomb or missile as it is elevated into shackle connecting position.

A still further object of the invention is the provision of material handling apparatus having a wide range of boom traverse and acceleration capability while the apparatus itself is relatively compact, lightweight, and of relatively small overall dimensions.

A still further object of the invention is the provision of a novel material handling apparatus as described hereinabove which is relatively easy to maintain, simple in operation, and having a wide range of uses.

A still further object of the invention is to provide a novel material handling apparatus mounted upon a self-propelled platform and having an overall elevating boom reach of approximately four times the overall width and height of the retracted boom dimensions; thus, providing the material handling apparatus with the necessary compactness for operating in relatively narrow confines.

The invention further resides in certain novel features of construction, combinations and arrangements of parts, and further objects and advantages of the invention will be apparent to those skilled in the art to which it pertains from the following description of the preferred embodiment thereof described with reference to the accompanying drawings, which form a part of this specification, and wherein the same reference characters represent corresponding parts throughout the several views, and in which.

Figure 1:
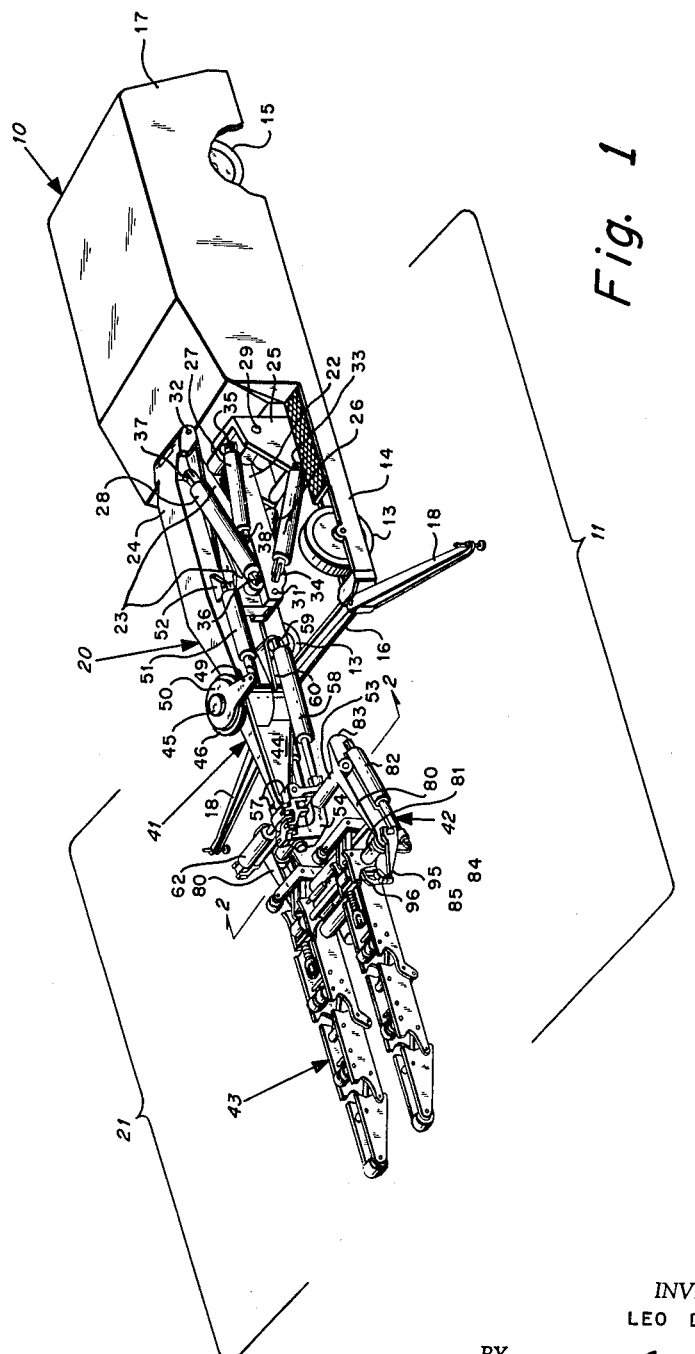
Fig. 1 is a pictorial view of a material handling apparatus embodying the invention and is shown in position for picking up a material such as a missile, a part of the apparatus being removed or broken away for the purpose of clearly illustrating certain details thereof.

It is to be understood that the invention is not limited to the details of construction and arrangement of parts shown in the drawings and hereinafter described in detail, but is capable of being otherwise embodied and of being carried out in various ways. It is to be further understood that the phraseology or terminology employed herein is for the purpose of description and there is no intention to herein limit the invention beyond the requirements of the prior art.

Referring to Fig. 1, a material handling apparatus embodying the invention comprises a self-propelled steerable vehicle, indicated generally by the reference numeral 10, having mounted thereon an hydraulically extendable and retractable, articulated material handling apparatus, indicated generally by the reference numeral 11.

The vehicle 10 comprises a pair of rubber tired, non-steerable front wheels 13 journalled near the forward ends of a pair of parallel longitudinal frame sills 14 and a pair of closely spaced rubber-tired steerable rear wheels 15 located at the rear end of the vehicle 10. The vehicle 10 has a plurality of cross members, of which only a forward end cross member 16 is shown, connecting the sills 14 for forming a box frame suitable for supporting conventional equipment including a prime mover such as an internal combustion engine, an hydraulic pump driven by the engine, a driving and steering mechanism for the rear wheels 15, an hydraulic fluid reservoir, and an hydraulic fluid pressure accumulator, all of which are housed within a nacelle 17 and therefore are hidden from view. The forward corners of the box frame of the vehicle 10 are each provided with a pivotally mounted laterally extending outrigger-type stabilizer 18 having a vertically adjustable ground engaging foot 19 threaded through the outermost and free end thereof.

The material handling apparatus 11 comprises a lifting boom assembly and a universal head assembly, respectively indicated generally by the reference numerals 20, 21. The lifting boom assembly 20 has a first stage boom 22, a second stage boom 23, and a third stage boom 24 pivotally mounted for up and down movement on a channel-shaped boom supporting turntable or swivel 25. The booms 22, 23, 24 are of an inverted U-shaped cross-section with transverse reinforcing webs, not shown. The booms 22, 23, 24, are respectively raised and lowered by pairs of extensible hydraulic motors 26, 27, 28. The rear end of the first stage boom 22 is pivotally connected between the flange or legs of the channel-shaped swivel 25 near the upper edges thereof by means of a transversely arranged horizontal journal pin 29. The booms 22, 24 are bifurcated at the forward and rear ends thereof, respectively, for permitting the pivotal mounting therebetween of the respective ends of the second stage boom 23 by means of transversely arranged horizontal journal pins 31, 32.

The hydraulic motors 26, 27, 28 have the ends of piston rods and cylinders thereof universally mounted for self-alignment purposes by means of similar transversely disposed horizontal journal pins 33, 34, 35, 36, 37 and 38. The cylinder and rod ends of the motors 26, 27, 28 are bifurcated for providing mounting ears at the ends thereof. The journal pins 35, 37 are located near the respective rear ends of the booms 22, 24 for connection with the mounting ears of the rear ends of the pairs of motors 27, 28, respectively, on either side thereof. The pins 36 and 38 are located at the upper forward end of the boom 23 for connection with the forward ends of the motors 28, 27, respectively. The pins 34, 33 are respectively located at the lower forward end portion of the boom 22 and the swivel 25 for connection with the ends of the two motors 26. Each motor is comprised of a cylinder with a movable piston therein having a connecting rod attached to and driven by hydraulic fluid pressure acting on the piston. Preferably each hydraulic motor referred to herein is double-acting and is provided with the necessary ports and hose connections for operating the same. The hydraulic control valves and circuits are conventional and, accordingly, are not shown.

From the foregoing, it is apparent that the three stage boom assembly 20 can be turned for providing a limited variable azimuth and is preferably extendable to a height at least four times the normal height of the vehicle 10 and retractable to a height shown in Fig. 1, which is substantially the same as that of the vehicle 10. The sequence of operation of the various boom motors 22, 23, 24 can be controlled by separate valves or where only one control valve is used may depend upon the size and the resistance met by each pair of motors, and accordingly, the booms, if desired, can be adapted to be raised and retracted in a selected sequence.

The third stage boom 24 extends forwardly of the outriggers 18 and the frame of the vehicle 10 and has the universal head assembly 21 swingably mounted at the forward end of the boom 24 about an axis lying in a generally vertical plane extending along the longitudinal center line of the boom 24. A relatively large forward extension of the universal head assembly 21 is produced when the movement of the second stage boom 23 is large compared to the movement of the first and third stage booms 22, 24.

The universal head assembly 21 is comprised of three main subassemblies; a boom head subassembly indicated generally by the reference numeral 41, a finger and thumb support subassembly indicated generally by the reference number 42, and a subassembly of two fingers and thumbs indicated generally by the reference numeral 43.

The boom head subassembly 41 includes a cast I-beam cantilevered boom head member 44 pivotally connected by means of a planetary gear arrangement to a vertical pin 45 fixed to the outer end of the third stage boom 24. The planetary gear arrangement comprises a ring gear 46 horizontally fixed to the upper side of the outer end of the third stage boom 24, a hidden coplanar annular internal sun gear fixed to the boom head member 44, and eight hidden coplanar planetary gears meshing with the sun gear and the ring gear 46 and carried by an annular carrier plate having an actuating arm 49 laterally extending from beneath a fixed housing cover plate 30. Approximately 45 degrees of movement of the planetary gear plate and actuating arm 49 produces 180 degrees of movement of the universal head assembly 41. Movement of the head assembly 41 is provided by the extension and retraction of an hydraulic boom head azimuth motor 51 mounted alongside the third stage boom 24. The boom 24 has a horizontal leg 52 to which is mounted one end of the cylinder of the motor 51. The rod end of the motor 51 is pivotally mounted to the outer end of the horizontal actuating arm 49.

Figure 3:
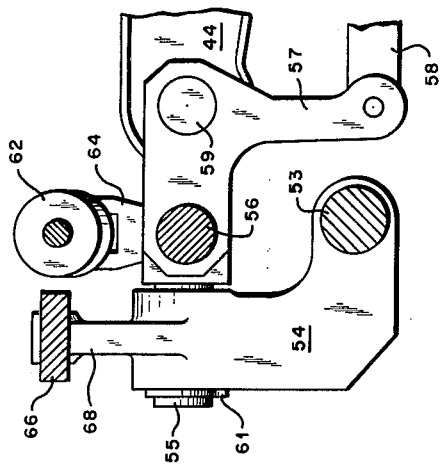
Fig. 3 is a view along line 3—3 in Fig. 2.
Figure 2:
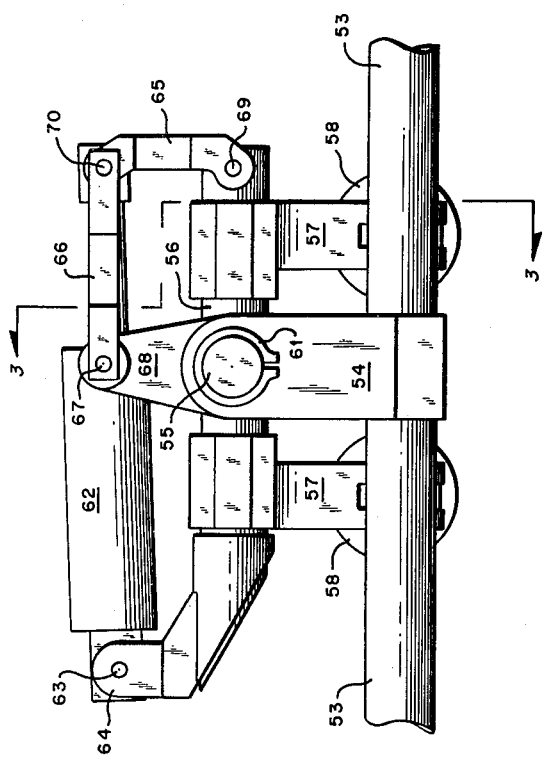
Fig. 2 is an enlarged fragmentary sectional view along line 2—2 in Fig. 1 for showing details of a roll head member.

The finger and thumb support subassembly 42 is mounted for universal movement at the lateral ends of a relatively long transverse shaft 53, Figs. 1, 2, 3, centrally fixed within a lower leg of an L-shaped cast head roll member 54. The head roll member 54 is journaled for angular movement in the upper leg thereof on a stub shaft 55, which is fixed to a transverse cylindrical arm 56. The arm 56 has the forwardly extending arms of two parallel bell cranks 57 fixed thereto at the outer or forward ends thereof.

The bell cranks 57 are pivotally mounted at the bight portions thereof on a transverse pin 59 in the forward end of the boom head member 44 on either side of the latter. The downwardly extending other leg of each bell crank 57 is pivotally connected to a hydraulic head elevation motor 58, the rods of each of the motors 58 being pivotally connected to a downwardly extending arm of a corresponding bell crank 57. The cylinder of each of the motors 58 is pivotally connected to a transverse journal pin 59 extending through a free, rearwardmost end of a generally rearwardly extending cantilever beam 60 of the boom head member 44. When the boom head member 44 is coextensive with the third stage boom 24, the beam 60 is disposed beneath the boom 24.

The head roll member 54, which is retained on stub shaft 55 by means of a snap ring 61, is turned about the stub shaft 55 by means of a transversely disposed head vertical roll motor 62, Figs. 1, 2. The cylinder end of the motor 62 is pivotally connected with a horizontal pin 63 to an upstanding mounting lug 64 fixed to an adjoining end of the arm 56. The rod end of the motor 62 is adapted to be extended and retracted for turning the roll member 54 via an H-shaped connecting member 65 and a transverse link 66. The transverse link 66 by means of a pin 67 is pivotally connected to an upwardly extending actuating arm 68 of the roller member 54. The generally H-shaped connecting member 65 has the lower two legs thereof straddling the outermost end of the arm 56 and is pivotally connected thereto with a pin 69. The upper two legs of the H-shaped member 70 are laterally offset from the lower two leg members with one of the upper legs being pinned between a bifurcated end of the rod end of the motor 62 and with the other upper leg being pinned between the bifurcated outer lateral end of the transverse link 66 with a pin 70.

Accordingly, it is apparent that the transverse shaft 53 can be tilted in three different planes by means of the azimuth motor 51, the head elevation motors 58, and the head vertical roll motor 62.

Figure 4:
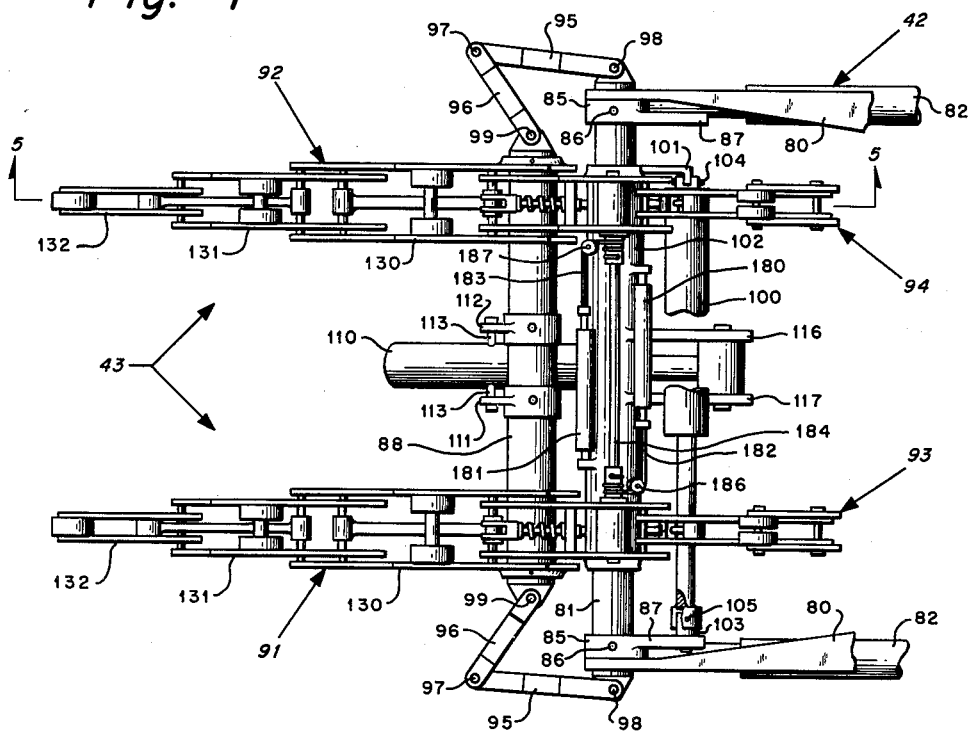
Fig. 4 is an enlarged detail view of a swivel arm subassembly having two fingers and thumbs in extended position.

The finger support subassembly 43, Figs. 1 and 4, is supported by the transverse shaft 53, at the lateralmost ends thereof, by means of a pair of parallel I-beam arms 80 fixed to the shaft 53 in such a manner as to extend forwardly thereof at a small, constant, downward angle from the head roll axis. Extending between and journaled in the forward ends of the arms 80 is a turnable finger support shaft 81 adapted to be tilted by means of two parallel finger elevation motors 82. The cylinder end of each of the motors 82 is pivotally connected to the end of a rearward extension 83 of each of the arms 80. The rod end of each of the motors 82 is pivotally connected to a downwardly extending actuating lever 84 of a two-armed crank 85 fixed by pins 86 near ends of the finger support shaft 81 between the arms 80, Figs. 1, 4 and 5. Each crank 85 also has an upwardly extending lever arm 87 fixed thereto for a purpose to be described. Extension and retraction of the finger elevation motors 82 respectively raises and lowers the finger subassembly about the longitudinal axis of the shaft 81.

Figure 5:
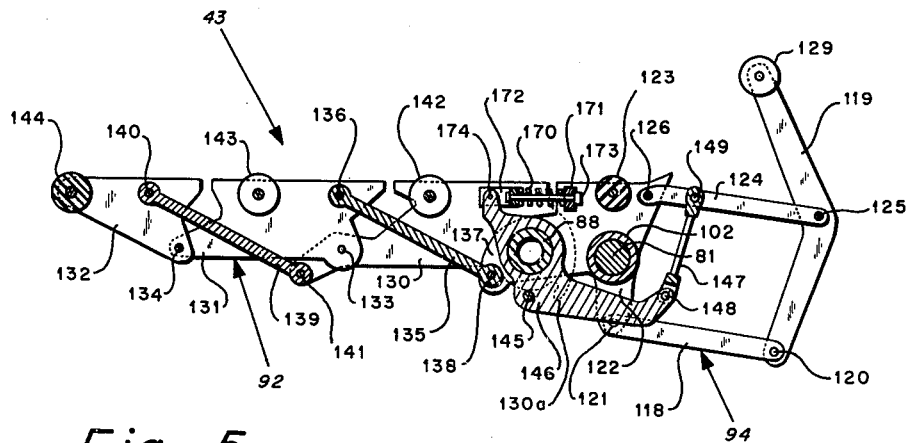
Fig. 5 is a sectional view of a finger and thumb along line 5—5 in Fig. 4.
Figure 6:
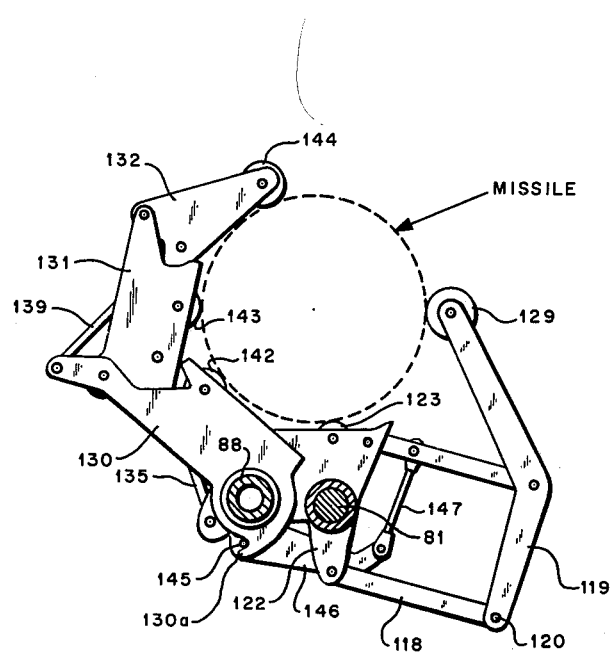
Fig. 6 is a view similar to Fig. 5 but with the finger and thumb in a gripping position about a missile shown in hidden outline.

As the motors 82 are extended, the entire finger and thumb subassembly 43 is moved upwardly in a clockwise direction, Figs. 5 and 6, about the finger support tube 81. This is accomplished by extending the motor 82 and turning the cranks 85 in a clockwise direction, Figs. 5 and 6. The finger and thumb subassembly is comprised of a transverse tilt tube 88 carrying fingers 91, 92 and thumbs 93, 94.

The tilting of the subassembly 43 is effected by means of two pairs of Y-shaped swivel arms 95, 96, each pair being pinned together at the juxtaposed leg ends thereof to form an elbow pivotable about a pin 97. The bifurcated ends of the arms 95 are pinned with pins 98 to the opposite outer ends of the shaft 81 so as to be turned with the shaft 81 and the cranks 87. The bifurcated end of the arms 96 are pinned by pins 99 to plugs 109 journaled in the opposite ends of the tilt shaft 88. It will be noted that upon the extension or retraction of the motors 82 that the elbows of the arms 95, 96 will not be bent or angularly displaced about pins 97, 98, 99 with the result that rigid lever arm means are provided for elevating or tilting the finger and thumb subassembly 43. However, fastening means such as set screws in a groove in each of the plugs 109, which grooves are not shown, are for constraining the plugs 109 against axial movement in the tube 88 when the tube 88 is laterally shifted by a lateral slide motor 110.

The elbows of the arms 95, 96 will be bent in opposite directions about pins 97 by the extension or retraction of a lateral slide motor 100, which has the cylinder end pivotally connected to a generally rearwardly and upwardly extending L-shaped mounting lug 101 rigidly fixed to an extreme end of a finger and thumb subassembly lateral guide and carrier sleeve 102. The sleeve 102 is slidably disposed for lateral or side-to-side axial movement along the tube 81 by the extension or retraction of the motor 100. The rod end of the motor 100 is pivotally connected to an oppositely disposed mounting lug 103 carried by the upper arm 87 of the left hand crank 85. The ends of the motor 100 are pinned by means of pivot pins 104, 105 having parallel axes but extending in directions perpendicular to each other. By pivotally supporting both ends of the motor 100, the same will be self-aligning and will not be damaged by the tilting of the subassembly 43 relative to the tube 81 and the cranks 85.

Referring to Fig. 4, the guide and carrier sleeve 102 cannot be tilted or turned relative to the tube 81 upon which it is mounted because of the manner in which the lateral slide motor 100 is connected to one of the cranks 85.

A finger and thumb operating motor 110 has the cylinder end thereof slung underneath the tilt shaft 88 and pivotally supported thereat by means of a pair of parallel, downwardly extending suspension plates 111, 112, which are rigidly connected to the tilt shaft 88. A pair of trunnions 113 extends through the lower ends of the plates 111, 112 from the cylinder midportion of the motor 110. The rod end of the motor 110 is pivotally connected by means of a transverse pin 115 to a pair of parallel and rearwardly extending lever arms 116, 117, which are rigidly connected to the sleeve 102.

Figs. 5 and 6 respectively show the fingers 91, 92 and thumbs 93, 94 relaxed in an open position and contracted into a closed or gripping position. The identical fingers 91, 92 and thumbs 93, 94 are operated in unison. Accordingly, only the structure and operation of the finger 92 and thumb 94 need be described.

The thumb 94 is comprised of a first joint 118 and a second or end joint 119. As best seen in Fig. 4, the joint 118 is comprised of two parallel rectilinear plates having the outer ends thereof pinned by means of a pin 120 to the joint 119. The joint 119 is comprised of two generally crescent-shaped plates more closely spaced together than the plates of the joint 118 so that a tapered finger effect is provided. The other end of the joint 118 is pivotally connected by means of a pin 121 to a pair of parallel actuating lever plates 122 fixed to and downwardly depending from the sleeve 102. The upper portion of the actuating lever plates 122 extends above the sleeve 102 and is adapted to support a missile roller 123, which will be later described. Additionally, a parallelogram linkage arrangement for operating the thumb 94 is completed with a pair of parallel guide links 124 which is pinned with a pin 125 the rear end thereof at the midpoint or bend portion of the thumb's end joint 119 between the plates forming the latter. The forward end of the parallel guide links 124 is pinned with a pin 126 at the upper trailing end of the actuating lever plate 122. From the foregoing, it is apparent that clockwise movement of the actuating guide links 124, Fig. 5, will cause the thumb 94 to curl forwardly into engagement with a store material, such as a missile, Fig. 6. The bulk of the weight of the missile will rest on the roller 123 supported by the actuating plates 122 and a similar roller of the finger 91 and the thumb 93 when the subassembly 43 position is as shown in Figs. 5 and 6. A rubber roller 129 is journaled between the upper ends of the plates forming the end joint 119 of the thumb 94 for engaging the missile periphery.

The finger 92 has a first joint 130, a second or middle joint 131, and a third or tip joint 132. Each of the joints comprises a pair of interconnected parallel plates extending in a forward direction. The joints 130, 131, 132, like the thumb joints, are successively of lesser width for simulating the taper of human fingers. The first joint 130 is rigidly fixed about one end of the tilt shaft 88 for being angularly or laterally displaced therewith by the extension or retraction of the motor 110.

With particular reference to Figs. 5 and 6, the first joint 130, which is fixed to the shaft 88, pivotally supports the middle joint 131 by means of a transverse pivot pin 133. Similarly, the finger tip joint 132 is pivotally supported by the middle joint 131 by means of a transverse pivot pin 134.

As the finger and thumb operating motor 110 is extended, the joint 130 is driven in a clockwise direction in a manner to be described. As a result, the middle joint 131 will be caused to be tilted in a clockwise direction about its pin 133 by means of a middle joint operating tendon or tension rod 135. The rod 135 is pivotally connected to the upper rearward end of the joint 131 by means of a pin 136. The opposite end of the tendon 135 is pivotally connected to forward extensions 137 of the plates 122 by means of a pin 138. The extensions 137 are journaled on the tilt shaft 88.

Similarly, the finger tip joint 132 is tilted in a clockwise direction about its pivot pin 134 by means of a tendon rod 139. Pins 140, 141 respectively pivotally connect the tendon rod 139 at its upper end to the end joint 132 and at its lower end to the leading end of the first joint 130.

A rubber roller 142, 143, and 144 is journaled between the plates of each of the joints 130, 131, 132, respectively, for engaging the missile, Fig. 6, at angularly spaced points on the periphery thereof when the finger is retracted. More particularly, the roller 142 is positioned to only partially extend above a generally rectilinear upper edge of the first joint 130. The roller 143 is similarly positioned between the plates forming the middle finger joint 131 between the ends of the latter; and the roller 144 is positioned between the extreme forward or leading ends of the end finger joint 132. The upper edges of the joints 122, 130, 131, 132, as seen in Fig. 5, are rectilinear and generally mutually coextensive.

If desired, channel-shaped rubber edging, not shown, may be used to protect the upper edges of the finger joint plates. The rubber will also protect the missile that is being handled as scratches and dents will generally tend to upset the ballistics of the missile.

The contraction of the thumb 94 is effected by means of a hook 130a formed in the aft ends of each of the plates forming the first finger joint 130. The hooks 130a are adapted after some initial lost motion of approximately 30 to 45 degrees, to engage a follower pin 145 extending through an elbow portion of a fore and aft extending follower arm 146. The follower arm 146 is journaled on the tube 88 between the plates of the joint 130. The outer or aft end of the arm 146 is pivotally connected to a lower end of a follower tendon member 147 by means of a pin 148. The upper end of the tendon member is pivotally connected with a pin 149 between the guide links 124 at a point approximately half way between the pin 126 and the midpoint of the links 124.

The arm 146, and, accordingly, thumb 94 is normally biased in a counterclockwise direction to a relaxed position by means of a spring arrangement acting between the upper end or shoulder of the arm 146 and opposed edges of the plates forming the joint 122. The spring arrangement comprises a spring 170 reacting at one end against a cross member 171 fixed between the plates of the joint 122 and at the other end against a U-shaped bracket 172 which straddles and is pivotally connected to the shoulder of the arm 146. A spring guide pin 173 is slidably disposed in the member 171 and the bight of the bracket 172 for holding the spring 170 in operative position. It will be noted that the spring 170 will be compressed when the arm is driven in a clockwise direction, Figs. 4 and 5, and the thumb 94 is contracted whereby the thumb's roller 129 will be caused to move downwardly and forwardly for engaging the missile periphery.

The linkages forming the thumb 94 and the finger 92 are so arranged that the rubber rollers 123, 129, 142, 143 and 144 continuously circumscribe true circles as they contract to diameters between predetermined limits. In the preferred embodiment, the material handling apparatus is adapted to handle missiles having diameters ranging between 8 and 12 inches.

One of the features of this invention is that the missile can be rotated and thereby oriented about the longitudinal axis thereof. Referring to Fig. 4, the rubber rollers 123 are adapted to be driven in a clockwise direction, Figs. 5 and 6, by the retraction of an hydraulic motor 180. Similarly, the rollers 123 can be rotated in a counterclockwise direction by the retraction of an hydraulic motor 181.

More particularly, the cylinders of the motors 180, 181 are fixed in a parallel arrangement in oppositely facing directions upon the sleeve 102 for lateral movement therewith. Each of the rods of the respective motors 180, 181 have the outer ends thereof fixed to a flexible cable 182, 183 which is wrapped around the ends corresponding thereto of a drive shaft 184 fixedly interconnecting the driven rollers 123. The cable 182 is pivotally disposed about a pulley 186 and is wrapped in a counterclockwise direction, Figs. 5 and 6, about the corresponding end of the drive shaft 184, the extreme end of the cable 182 being fixed to the shaft 184. The cable 183 is disposed around a pulley 187 and is wrapped in an opposite or clockwise direction about the corresponding end of the shaft 184 and fixed thereto.

If desired, a mechanical differential can be used to provide a mechanical advantage between the motors 180, 181 and the rollers 123.

From the foregoing, it is apparent that the material handling apparatus can be self propelled to a dolly upon which a missile is resting and the fingers 91, 92 can be positioned beneath the missile. This is accomplished by operating the parallel motors 26 for elevating the first boom section 33 relative to the turntable 25, elevating and forwardly extending the fingers 91, 92 by extending the motors 27 of the second boom section 23, or elevating and slightly retracting the fingers 91, 92 by the operation of the motors 28 which operates the third boom section 24.

No motors are shown for turning the turntable 25. However, it is to be understood that conventional means can be applied for so operating the turntable 25. For most purposes the 180 degree traverse of the motor 57 driven boom 44, which carries the finger and thumb subassemblies 42, 43, is sufficient to eliminate the necessity of a turntable drive apparatus. Also, the fingers 91, 92 can be tilted downwardly and upwardly by means of the motors 61 or rolled about the axis of the stub shaft 55 by means of the motor 62. Accordingly, the motors 51, 61, and 62 provide universal articulated movement to the subassemblies 42 and 43.

The subassembly 43 can also be elevated in a vertical plane by the motors 82 or be shifted laterally by means of the motor 100. Therefore, it is readily apparent that a large number of control means are available for enabling an operator to accurately position the fingers 91, 92 beneath a missible and then grasp the missile by merely operating a control, not shown, for extending the motor 110.

Conversely, a missile can be released by simply retracting the motor 110 and then retracting the motors 82 for respectively relaxing the grip of the fingers 91, 92 and thumbs 93, 94 and lowering or tilting the fingers 91, 92 downwardly. The vehicle 10 can then be backed away.

Obviously, the invention is especially useful for loading armaments such as bombs and missiles aboard aircraft and can be operated to position the armaments in relatively high places. The operator need not fear that a missile will be dropped as the limitations of the roll motor 62 is such that the same will permit only a limited roll angle in either direction about the stub shaft 55.

It is the intention to hereby cover not only the preferred construction shown and described herein, but all adaptations, modifications, and uses thereof which come within the practice of those skilled in the art to which the invention relates, and the scope of the appended claims.

What is claimed is:

1. A material handling apparatus comprising, a vehicle, a turntable mounted on said vehicle, a first boom member extending forwardly of said vehicle and having a rear end pivotally connected to said turntable, first hydraulic motor means having the ends thereof pivotally connected to said first boom member and said turntable for elevating and lowering the forward end of said first boom member by respectively extending and retracting said first hydraulic motor means, a second boom member having a forward end pivotally connected to a forward end of said first boom member, second hydraulic motor means having the ends thereof pivotally connected to the rear end of said first boom means and an intermediate portion of said second boom member for elevating and lowering said second boom member by respectively extending and retracting said second hydraulic motor means, a third boom member having a rear end pivotally connected to a rear end of said second boom member, third hydraulic motor means having the ends thereof pivotally connected to a forward end of said second boom member and to an intermediate portion of said third boom member for elevating and lowering the latter by respectively extending and retracting said third motor means, a fourth boom member vertically pivoted to the forward end of said third boom means, fourth hydraulic motor means having the ends thereof pivotally connected to an intermediate portion of said third boom member and to said fourth boom member for horizontally swinging the forward end of the latter when said fourth hydraulic motor means are extended or retracted, material handling means carried by said fourth boom means adapted to hold a store, and means articulately connecting said material handling means to said fourth boom means.

2. A material handling apparatus comprising, a vehicle, a turntable adapted to be mounted on said vehicle, a first boom member extending forwardly of the vehicle and having a rear end pivotally connected to said turntable, first hydraulic motor means having the ends thereof pivotally connected to said first boom member for elevating and lowering the forward end thereof by respectively extending and retracting said first hydraulic motor means, a second boom member having a forward end pivotally connected to a forward end of said first boom member, second hydraulic motor means having the ends thereof pivotally connected to the rear end of said first boom means and an intermediate portion of said second boom member for elevating and lowering said second boom member by respectively extending and retracting said second hydraulic motor means, a third boom member having a rear end pivotally connected to a rear end of said second boom member, third hydraulic motor means having the ends thereof pivotally connected to a forward end of said second boom member and to an intermediate portion of said third boom member for elevating and lowering said third boom member by respectively extending and retracting said third motor means, a fourth boom member vertically pivoted to the forward end of said third boom means, fourth hydraulic motor means having the ends thereof pivotally connected to an intermediate portion of said third boom member and to said fourth boom member for horizontally swinging the forward end of the latter when said fourth hydraulic motor means are extended and retracted, material handling means carried by said fourth boom means, and means universally connecting said material handling means to said fourth boom means, said boom members and said hydraulic motor means being arranged and proportional in such a manner that the overall reach of said material handling means is approximately four times the height thereof when retracted, and said boom members and material handling means being retractable to a height substantially the same as the height of said vehicle.

3. A material handling apparatus comprising, support means, a universal head member pivotally connected to said support means for pivotal movement about a transverse axis, a pair of forwardly extending arm means pivotally connected to said universal head member for pivotal movement about a longitudinal axis, first hydraulic motor means pivotally connected to said support means and said universal head means for turning the latter about the transverse axis thereof, second hydraulic motor means connected to said universal head means and said arm means for turning the latter about the longitudinal axis thereof, material handling means carried by said arm means, third hydraulic motor means connected to said arm means and said material handling means for tilting the latter about a transverse axis thereof, and fourth hydraulic motor means for laterally sliding said material handling means relative to said arm means.

4. A material handling apparatus comprising, support means, a universal head member pivotally connected to said support means for pivotal movement about a transverse axis, a pair of forwardly extending arm means pivotally connected to said universal head member for pivotal movement about a longitudinal axis, first hydraulic motor means pivotally connected to said support means and said universal head means for turning the latter about the transverse axis thereof, second hydraulic motor means connected to said universal head means and said arm means for turning the latter about the longitudinal axis thereof, material handling means carried by said arm means, and third hydraulic motor means connected to said arm means and said material handling means for tilting the latter about a transverse axis thereof.

5. A material handling apparatus for a store of circular cross-section comprising, support means, a universal head member pivotally connected to said support means for pivotal movement about a transverse axis, a pair of forwardly extending arm means pivotally connected to said universal head member for pivotal movement about a longitudinal axis, first hydraulic motor means pivotally connected to said support means and said universal head means for turning the latter about the transverse axis thereof, second hydraulic motor means connected to said universal head means and said arm means for turning the latter about the longitudinal axis thereof, material handling means carried by said arm means, third hydraulic motor means connected to said arm means and said material handling means for tilting the latter about a transverse axis thereof, fourth hydraulic motor means for laterally sliding said material handling means relative to said arm means, roller means carried by said material handling means for rotating the store, and fifth hydraulic motor means for rotating said roller means.

6. An apparatus for handling a material comprising, support means, a universal head member pivotally connected to said support means for pivotal movement about a transverse axis, a pair of forwardly extending arm means pivotally connected to said universal head member for pivotal movement about a longitudinal axis, first hydraulic motor means pivotally connected to said support means and said universal head means for turning the latter about the transverse axis thereof, second hydraulic motor means connected to said universal head means and said arm means for turning the latter about the longitudinal axis thereof, material handling means carried by said arm means, third hydraulic motor means connected to said arm means and said material handling means for tilting the latter about a transverse axis thereof, fourth hydraulic motor means for laterally sliding said material handling means relative to said arm means, and means for orienting the material about an axis transverse to said arm means.

7. A material handling apparatus comprising, support means, laterally spaced and longitudinally extending arm means, transverse shaft means journaled in the ends of said arm means, sleeve means slidably journaled on said transverse shaft means, longitudinally extending finger means having finger support joint means fixed to said sleeve means, pivot shaft means journaled in said finger support joint means, swivel arm means connected to said transverse shaft means and said pivot shaft means in such a manner as to permit relative parallel axial movement of both said shaft means, crank means fixed to said transverse shaft means, first hydraulic motor means connected to said arm means and said crank means for angularly tilting said finger means and said sleeve means about the longitudinal axis of said transverse shaft means, second hydraulic motor means connected to said crank means and said sleeve means for sliding said finger means and said sleeve means longitudinally of said transverse shaft means, said finger means having a first joint, a second joint, a third joint, said first finger joint having one end fixed to said pivot shaft means, said second finger joint being pivotally connected to said first finger joint, said third finger joint being pivotally connected to said second finger joint, a first tendon member having the ends thereof pivotally connected to said second finger joint and said finger support joint means, a second tendon member having the ends thereof pivotally connected to said third finger joint and said first finger joint, third hydraulic motor means disposed transversely of said sleeve means and having one end pivotally connected to said sleeve means and the other end pivotally connected to said pivot shaft means in such a manner that the extension and retraction of said third hydraulic motor means respectively retracts and extends said finger means, thumb means having a first joint and a second joint, one end of said first thumb joint being pivotally connected to said finger support joint means opposite to said first finger joint and the other end of said first thumb joint being pivotally connected to one end of said second thumb joint, a guide link disposed parallel to said first thumb joint and pivotally connected at the ends thereof to said second thumb joint and said finger support joint means, actuating arm means having the ends thereof pivotally connected to said finger support joint means and said guide link, said first finger joint being adapted to engage said actuating arm means for causing the retraction of said thumb means concurrently with the retraction of said finger means, thumb biasing means for biasing said thumb means to an extended position, store support roller means journaled on said finger support joint means, fourth hydraulic motor means parallelly fixed to said sleeve means, and drive transmission means interconnecting said roller means and said fourth hydraulic motor means for rotating said roller means.

8. A material handling apparatus comprising, support means, laterally spaced and longitudinally extending arm means, transverse shaft means journaled in the ends of said arm means, sleeve means slidably journaled on said transverse shaft means, longitudinally extending finger means having finger support joint means fixed to said sleeve means, pivot shaft means journaled in said finger support joint means parallel to said transverse shaft means, swivel arm means connected to said transverse shaft means and said finger support joint means for moving the latter parallel to said transverse shaft means, crank means fixed to said transverse shaft means, first hydraulic motor means connected to said arm means and said crank means for angularly tilting said finger means and said sleeve means about the longitudinal axis of said transverse shaft means, second hydraulic motor means connected to said crank means and said sleeve means for sliding said finger means and said sleeve means longitudinally of said transverse shaft means, said finger means having a first joint, a second joint, and a third joint, said first finger joint having one end fixed to said pivot shaft means, said second finger joint being pivotally connected to said first finger joint, said third finger joint being pivotally connected to said second finger joint, a first tendon member having the ends thereof pivotally connected to said second finger joint and said finger support joint means, a second tendon member having the ends thereof pivotally connected to said third finger joint and said first finger joint, third hydraulic motor means disposed transversely of said sleeve means and having one end pivotally connected to said sleeve means and the other end pivotally connected to said pivot shaft means in such a manner that the extension and retraction of said third hydraulic motor means respectively retracts and extends said finger means, thumb means having a first joint and a second joint, one end of said first thumb joint being pivotally connected to said finger support joint means opposite to said first finger joint and the other end of said first thumb joint being pivotally connected to one end of said second thumb joint, a guide link disposed parallel to said first thumb joint and pivotally connected at the ends thereof to said second thumb joint and said finger support joint means, actuating arm means having the ends thereof pivotally connected to said finger support joint means and said guide link, said first finger joint being adapted to engage said actuating arm means for causing the retraction of said thumb means upon the retraction of said finger means, and thumb biasing means for biasing said thumb means to an extended position.

9. A material handling apparatus comprising, support means, laterally spaced and longitudinally extending arm means, transverse shaft means journaled in the ends of said arm means, sleeve means slidably journaled on said transverse shaft means, longitudinally extending finger means having finger support joint means fixed to said sleeve means, pivot shaft means journaled in said finger support joint means parallel to said transverse shaft means, swivel arm means connected to said transverse shaft means and said finger support joint means for moving the latter parallel to said transverse shaft means, crank means fixed to said transverse shaft means, first hydraulic motor means connected to said arm means and said crank means for angularly tilting said finger means and said sleeve means about the longitudinal axis of said transverse shaft means, second hydraulic motor means connected to said crank means and said sleeve means for sliding said finger means and said sleeve means longitudinally of said transverse shaft means, said finger means having a first joint, a second joint, and a third joint, said first finger joint having one end fixed to said pivot shaft means, said second finger joint being pivotally connected to said first finger joint, said third finger joint being pivotally connected to said second finger joint, a first tendon member having the ends thereof pivotally connected to said second finger joint and said finger support joint means, a second tendon member having the ends thereof pivotally connected to said third finger joint and said first finger joint, and third hydraulic motor means disposed transversely of said sleeve means and having one end pivotally connected to said sleeve means and the other end pivotally connected to said pivot shaft means in such a manner that the extension and retraction of said third hydraulic motor means respectively retracts and extends said finger means.

10. A material handling apparatus comprising, support means,, laterally spaced and longitudinally extending arm means, transverse shaft means journaled in the ends of said arm means, sleeve means slidably journaled on said transverse shaft means, longitudinally extending thumb means having support joint means fixed to said sleeve means, pivot shaft means journaled in said thumb support joint means parallel to said transverse shaft means, swivel arm means connected to said transverse shaft means and said thumb support joint means, crank means fixed to said transverse shaft means, first hydraulic motor means connected to said arm means and said crank arm means for angularly tilting said thumb means and said sleeve means about the longitudinal axis of said transverse shaft means, second hydraulic motor means connected to said crank arm means and said sleeve means for sliding said thumb means and said sleeve means longitudinally of said transverse shaft means, third hydraulic motor means disposed transversely of said sleeve means and having one end pivotally connected to said sleeve means and the other end pivotally connected to said pivot shaft means in such a manner that the extension and retraction of said third hydraulic motor means respectively retracts and extends said thumb means, said thumb means having a first joint and a second joint, one end of said first thumb joint being pivotally connected to said thumb support joint means opposite to said first finger joint and the other end of said first thumb joint being pivotally connected to one end of said second thumb joint, a guide link disposed parallel to said first thumb joint and pivotally connected at the ends thereof to said second thumb joint and said thumb support joint means, actuating arm means having the ends thereof pivotally connected to said thumb support joint means and said guide link, and means fixed to said pivot shaft means adapted to engage said actuating arm means for causing the retraction of said thumb means upon the extension of said third hydraulic motor means.

11. A material handling apparatus, as set forth in claim 10, further comprising, thumb biasing means for biasing said thumb means to an extended position, roller means journaled on said thumb support joint means, fourth hydraulic motor means parallelly fixed to said sleeve means, and drive transmission means interconnecting said roller means and said fourth hydraulic motor means for rotating said roller means.

12. A material handling apparatus comprising, support means, transverse shaft means fixed to said support means, sleeve means slidably journaled on said transverse shaft means, longitudinally extending finger means having finger support joint means fixed to said sleeve means, said finger means having a first joint, a second joint, and a third joint, pivot shaft means disposed parallel to said transverse shaft means and journaled in said finger support joint means, said first finger joint having one end fixed to said pivot shaft means, said second finger joint being pivotally connected to said first finger joint, said third finger joint being pivotally connected to said second finger joint, a first tendon member having the ends thereof pivotally connected to said second finger joint and said finger support joint means, a second tendon member having the ends thereof pivotally connected to said third finger joint and said first finger joint, first hydraulic motor means disposed transversely of said sleeve means and having one end pivotally connected to said sleeve means and the other end pivotally connected to said pivot shaft means in such a manner that the extension and retraction of said third hydraulic motor means respectively retracts and extends said finger means, thumb means having a first joint and a second joint, one end of said first thumb joint being pivotally connected to said finger support joint means opposite to said first finger joint and the other end of said first thumb joint being pivotally connected to one end of said second thumb joint, a guide link disposed parallel to said first thumb joint and pivotally connected at the ends thereof to said second thumb joint and said finger support joint means, actuating arm means having the ends thereof pivotally connected to said finger support joint means and said guide link, said first finger joint being adapted to engage said actuating arm means for causing the retraction of said thumb means upon the retraction of said finger means, thumb biasing means for normally biasing said thumb means to an extended position.

13. A material handling apparatus as set forth in claim 12, further comprising, roller means journaled on said finger support joint means, fourth hydraulic motor means parallelly fixed to said sleeve means, and drive transmission means interconnecting said roller means and said fourth hydraulic motor means for rotating said roller means.

14. An apparatus for handling a material of circular cross section comprising, support means, cradle means, means universally connecting said cradle means to said support means, first hydraulic motor means for moving said cradle means along each of the three mutually perpendicular axes, coaxial rollers journaled in said cradle means, a shaft fixed to said rollers, second hydraulic motor means having a cylinder fixed to said cradle means, a first pulley connected to said cradle means, a first cable having one end connected to the rod of said second hydraulic motor means and extending around said first pulley, the other end of said cable being wrapped around and fixed to said shaft for rotating said shaft and rollers upon the retraction of said hydraulic motor means, third hydraulic motor means having a cylinder fixed to said cradle means, a second pulley fixed to said cradle means, a second cable having one end connected to the rod of said third hydraulic motor means and extending around said second pulley, and the other end of said second cable being fixed to and wrapped around said shaft in a direction opposite to said first cable for rotating said shaft and said rollers in an opposite direction upon the retraction of said third hydraulic motor means.

15. A missile loader of the character described for connecting a missile to an aircraft comprising, self-propelled and steerable vehicle means, extensible and retractable boom means mounted on said vehicle means, boom operating means for controllably extending and retracting said boom means, missile grasping means adapted to grasp the missile, means substantially universally connecting said missile grasping means to said boom means, universal connection operating means for accurately controlling the attitude of said missile grasping means relative to three mutually perpendicular axes, missile roller means connected to said missile grasping means, and missile roller operating means for accurately orienting the missile along the longitudinal axes thereof and thereby aligning the missile for connection of the same to the aircraft.

16. A missile loader as set forth in claim 15, wherein said missile grasping means comprise a pair of parallel retractable and extendable index finger and thumb means.

17. A missile loader as set forth in claim 16, wherein said boom operating means, said universal connection operating means and said missile roller operating means are hydraulic.

18. A material handling apparatus comprising, a vehicle, a turntable mounted on said vehicle, a plurality of boom members connected end to end by horizontal pivots to form a chain, said chain connected at one end by a horizontal pivot to said turntable, an extensible motor means pivotally connected at its ends between adjacent boom members and between said chain and said turntable for elevating and lowering the free end by extending and retracting said motor means, an additional boom member connected at one end by a vertical pivot to the free end, and an additional extensible motor means pivotally connected at its ends between said additional member and said chain for horizontally swinging the free end of said additional member when said additional motor means is extended or retracted, and material handling means carried by said free end of said additional member adapted to hold a store.

References Cited in the file of this patent
UNITED STATES PATENTS
2,702,137  Ives _____ Feb. 15, 1955